US010909314B2

(12) United States Patent
Zhang et al.

(10) Patent No.: US 10,909,314 B2
(45) Date of Patent: Feb. 2, 2021

(54) CARD-BASED INFORMATION DISPLAYING METHOD AND APPARATUS, AND INFORMATION DISPLAYING SERVICE PROCESSING METHOD AND APPARATUS

(71) Applicant: ADVANCED NEW TECHNOLOGIES CO., LTD., Grand Cayman (KY)

(72) Inventors: Gan Zhang, Hangzhou (CN); Wei Fan, Hangzhou (CN); Xiangnan Wang, Hangzhou (CN)

(73) Assignee: ADVANCED NEW TECHNOLOGIES CO., LTD., Grand Cayman (KY)

(*) Notice: Subject to any disclaimer, the term of this patent is extended or adjusted under 35 U.S.C. 154(b) by 0 days.

(21) Appl. No.: 16/265,881

(22) Filed: Feb. 1, 2019

(65) Prior Publication Data
US 2019/0171699 A1 Jun. 6, 2019

Related U.S. Application Data

(63) Continuation of application No. PCT/CN2017/093786, filed on Jul. 21, 2017.

(30) Foreign Application Priority Data

Aug. 3, 2016 (CN) .......................... 2016 1 0630286

(51) Int. Cl.
*G06F 17/00* (2019.01)
*G06F 40/197* (2020.01)
(Continued)

(52) U.S. Cl.
CPC ........ *G06F 40/197* (2020.01); *G06F 3/04847* (2013.01); *G06F 8/65* (2013.01);
(Continued)

(58) Field of Classification Search
CPC .............................. G06F 40/197; G06F 40/194
(Continued)

(56) References Cited

U.S. PATENT DOCUMENTS 8,855,469 B2 10/2014 Maharajh et al.
9,424,283 B2 8/2016 Prabaker et al.
(Continued)

FOREIGN PATENT DOCUMENTS

CA 2602109 C 2/2015
CN 1794172 A 6/2006
(Continued)

OTHER PUBLICATIONS

Written Opinion of the International Searching Authority and International Search Report for PCT Application No. PCT/CN2017/093786 dated Oct. 20, 2017 (14 pages).
(Continued)

*Primary Examiner* — Stephen S Hong
*Assistant Examiner* — Matthew J Ludwig

(57) ABSTRACT

Disclosed in the present application are a card-based information displaying method and apparatus, and an information displaying service processing method and apparatus. The card-based information displaying method comprises: determining target information to be displayed and a card type of a first card for displaying the target information; determining whether a configuration version of a client supports the card type of the first card; when it is determined that the configuration version of the client does not support the card type of the first card, determining an association identifier corresponding to the first card, and associating with a second card supported by the configuration version of the client according to the association identifier; and displaying the target information of the client using the second card.

12 Claims, 7 Drawing Sheets

(51) Int. Cl.
  *G06F 16/00*    (2019.01)
  *H04M 1/725*    (2006.01)
  *G06F 9/451*    (2018.01)
  *G06F 3/0484*   (2013.01)
  *G06F 8/65*     (2018.01)

(52) U.S. Cl.
  CPC ............. *G06F 9/453* (2018.02); *G06F 16/00* (2019.01); *H04M 1/725* (2013.01)

(58) Field of Classification Search
  USPC .......................................... 715/229; 717/121
  See application file for complete search history.

(56) References Cited

U.S. PATENT DOCUMENTS

| | | | |
|---|---|---|---|
| 9,467,723 B2 | 10/2016 | Osminer | |
| 9,582,154 B2* | 2/2017 | Greenberg | .......... G06F 3/04842 |
| 10,353,534 B2* | 7/2019 | Grammatikakis | ...... G06F 9/451 |
| 2004/0043758 A1* | 3/2004 | Sorvari | ............... G06F 16/9562 |
| | | | 455/414.1 |
| 2006/0136432 A1 | 6/2006 | Villaron et al. | |
| 2007/0043766 A1 | 2/2007 | Nicholas et al. | |
| 2007/0061786 A1 | 3/2007 | Zhou et al. | |
| 2009/0300511 A1 | 12/2009 | Behar et al. | |
| 2011/0106841 A1* | 5/2011 | Cao | ......................... G06F 16/20 |
| | | | 707/769 |
| 2011/0173168 A1 | 7/2011 | Jones et al. | |
| 2013/0007709 A1* | 1/2013 | Fan | ............................ G06F 8/71 |
| | | | 717/121 |
| 2013/0104115 A1 | 4/2013 | Bertrand et al. | |
| 2013/0104251 A1 | 4/2013 | Moore et al. | |
| 2013/0166580 A1 | 6/2013 | Maharajh et al. | |
| 2013/0231093 A1 | 9/2013 | Toy et al. | |
| 2013/0298116 A1 | 11/2013 | Ou et al. | |
| 2014/0004944 A1 | 1/2014 | Lee et al. | |
| 2014/0043758 A1* | 2/2014 | Arflack | ............... H05K 7/20736 |
| | | | 361/690 |
| 2014/0195675 A1 | 7/2014 | Silver | |
| 2016/0072862 A1 | 3/2016 | Bader-Natal et al. | |
| 2016/0104202 A1 | 4/2016 | Greenberg et al. | |
| 2016/0105479 A1 | 4/2016 | McFarland et al. | |
| 2016/0149956 A1 | 5/2016 | Birnbaum et al. | |
| 2016/0212201 A1* | 7/2016 | Munemann | ........... H04L 67/306 |
| 2016/0321222 A1* | 11/2016 | Greenberg | ............ G06F 3/0482 |
| 2016/0357874 A1 | 12/2016 | Keel et al. | |
| 2017/0010765 A1* | 1/2017 | Sankaranarasimhan | ..................... |
| | | | G06N 20/00 |
| 2017/0053324 A1* | 2/2017 | Glover | .................... G06F 40/14 |
| 2018/0189256 A1* | 7/2018 | Gonzalez | .............. G06F 40/177 |
| 2019/0171699 A1 | 6/2019 | Zhang et al. | |
| 2019/0198232 A1* | 6/2019 | Sato | ....................... H01F 27/292 |

FOREIGN PATENT DOCUMENTS

| | | |
|---|---|---|
| CN | 101848368 A | 9/2010 |
| CN | 102075528 A | 5/2011 |
| CN | 1950765 B | 7/2011 |
| CN | 103166981 A | 6/2013 |
| CN | 104580375 A | 4/2015 |
| CN | 104881224 A | 9/2015 |
| CN | 104965813 A | 10/2015 |
| CN | 105446996 A | 3/2016 |
| CN | 106899750 A | 6/2017 |
| EP | 2451151 A1 | 5/2012 |
| KR | 20150105342 A | 9/2015 |
| KR | 20170060023 A | 5/2017 |
| TW | 200411563 A | 7/2004 |
| TW | 201351315 A | 12/2013 |

OTHER PUBLICATIONS

International Preliminary Report on Patentability Chapter I for PCT Application No. PCT/CN2017/093786 dated Feb. 14, 2019 (12 pages).
First Office Action and First Search for Chinese Application No. 201610630286.0 dated Jun. 26, 2019 with English machine translation (14 pages).
Non-final rejection and Search Report for Taiwanese Application No. 106119488 dated Nov. 14, 2018 (8 pages).
Decision to reject for Taiwanese Application No. 106119488 dated Apr. 23, 2019 (4 pages).
Supplementary Search for Chinese Application No. 201610630286.0 dated Feb. 20, 2020.

* cited by examiner

US 10,909,314 B2

CARD-BASED INFORMATION DISPLAYING METHOD AND APPARATUS, AND INFORMATION DISPLAYING SERVICE PROCESSING METHOD AND APPARATUS

CROSS-REFERENCE TO RELATED APPLICATIONS

The present application is a continuation application of International Patent Application No. PCT/CN2017/093786, filed on Jul. 21, 2017, which is based on and claims priority to the Chinese patent application No. 201610630286.0, filed on Aug. 3, 2016 and entitled "Card-Based Information Displaying Method and Apparatus, and Information Displaying Service Processing Method and Apparatus." The above-referenced applications are incorporated herein by reference in their entirety.

TECHNICAL FIELD

The present application relates to computer technology, particularly to a card-based information displaying method and apparatus, and an information displaying service processing method and apparatus.

BACKGROUND

Along with the rapid development of the Internet, more and more applications (APPS) adopt the form of Feed stream to display information to users. In the process of displaying information through Feed stream, the information to be displayed may be configured to be different types of cards according to the types of the information to be displayed.

However, with the continuous update of the version of an APP, new card types will appear in a new version of the APP. When the version of the APP used by a user has not been updated, these new types of cards cannot be displayed in the APP used by the user.

With respect to the situation where an APP cannot display a new type of card, the user is guided to proceed to an APP version update operation. After the user completes version update of the APP under the guidance, the new type of card will be displayed in the APP used by the user.

However, the method for achieving display of a new type of card in an APP by updating the APP version has the following problem: when the APP version update fails because the APP server is busy or due to other circumstances, the new type of card still cannot be displayed, causing a lower user experience of the APP.

SUMMARY

The embodiments of the present application provide a card-based information displaying method and apparatus as well as an information displaying service processing method and apparatus that solve the problem in the current technologies.

The embodiments of the present application provide a card-based information displaying method, comprising: determining target information to be displayed and a card type of a first card for displaying the target information; determining whether a configuration version of a client supports the card type of the first card; when it is determined that the configuration version of the client does not support the card type of the first card, determining an association identifier corresponding to the first card, and associating with a second card supported by the configuration version of the client according to the association identifier; and displaying the target information of the client using the second card.

In some embodiments, the client contains a list, which contains card types that are supported by the configuration version of the client, and determining whether the configuration version of the client supports the card type of the first card comprises: matching the card type of the first card with the card types contained in the list; and according to a match result, determining whether the configuration version of the client supports the card type of the first card.

In some embodiments, the client contains a corresponding relation between a version identifier of the configuration version of the client and the card type supported by the configuration version, and determining whether the configuration version of the client supports the card type of the first card comprises: determining the version identifier of the configuration version of the client, and based on the corresponding relation, determining the card type supported by the configuration version corresponding to the version identifier; and according to the card type of the first card and the determined card type supported by the configuration version of the client, determining whether the configuration version of the client supports the card type of the first card.

In some embodiments, associating with a second card supported by the configuration version of the client according to the association identifier comprises: according to the association identifier, determining card data of a second card associated with the first card; and according to the card data, determining a second card supported by the configuration version of the client.

In some embodiments, determining target information to be displayed and a card type of a first card for displaying the target information comprises: obtaining target information to be displayed and a card type of a first card for displaying the target information from cached data of a client.

In some embodiments, determining target information to be displayed and a card type of a first card for displaying the target information comprises: obtaining target information to be displayed and a card type of a first card for displaying the target information from a server.

In some embodiments, when target information to be displayed and a card type of a first card for displaying the target information are obtained from a server, the method further comprises: obtaining from a server a second card supported by the configuration version of the client and caching the second card; and associating with a second card supported by the configuration version of the client according to the association identifier comprises: associating with the cached second card according to the association identifier.

In some embodiments, the method further comprises displaying version update prompt information of the client using the second card.

The embodiments of the present application further provide an information displaying service processing method, comprising: receiving a service request sent by a client for obtaining target information, the service request containing a version identifier for determining a configuration version of the client, and the version identifier having a corresponding relation with a card type supported by the configuration version of the client; determining whether the configuration version of the client supports a card type of a first card for displaying the target information according to the card type corresponding to the version identifier; and when it is determined that the configuration version of the client does not support a card type of a first card for displaying the target information, returning to the client the target information and instruction information used to instruct the client to display the target information of the client using a second card supported by the configuration version of the client.

In some embodiments, returning to the client the target information and instruction information comprises: returning the target information and instruction information to the client in a form of a j son character string.

In some embodiments, the instruction information is further used to instruct the client to display version update prompt information using the second card.

The embodiments of the present application further provide a card-based information displaying apparatus, which is located on a client and comprises: one or more processors and one or more non-transitory computer-readable memories coupled to the one or more processors and configured with instructions executable by the one or more processors to cause the apparatus to perform operations comprising: determining target information to be displayed and a card type of a first card for displaying the target information; determining whether a configuration version of a client supports the card type of the first card; when it is determined that a configuration version of a client does not support the card type of the first card, determining an association identifier corresponding to the first card and associating with a second card supported by the configuration version of the client according to the association identifier; and displaying the target information of the client using the second card.

The embodiments of the present application further provide an information displaying service processing apparatus, which is located on a server and comprises: a receiving unit and a returning unit, wherein: the receiving unit, receiving a service request sent by a client for obtaining target information, wherein the service request contains a version identifier for determining a configuration version of the client, and the version identifier has a corresponding relation with a card type supported by the configuration version of the client; and the returning unit, when it is determined according to the card type corresponding to the version identifier that the configuration version of the client does not support a card type of a first card for displaying the target information, returning to the client the target information and instruction information used to instruct the client to display the target information and version update prompt information of the client using a second card supported by the configuration version of the client.

At least one of the foregoing technical solutions adopted by the embodiments of the present application can achieve the following beneficial effect: when it is determined that the configuration version of a client does not support the card type of a first card, a second card that is supported by the configuration version is associated through the association identifier in the first card, and the second card is used to display the target information and version update prompt information of the client, thus solving the problem in the current technologies that a new card type cannot be displayed if the configuration version of the client has not been updated. Furthermore, the card type of the second card may also be uniformly configured as a card type that is supported by a plurality of configuration versions. In this way, when it is determined that a client does not support a type of card, displaying can be conducted through this unified type of card, facilitating the management of the displayed cards.

BRIEF DESCRIPTION OF THE DRAWINGS

The drawings described herein are intended to provide a further understanding of the present application and constitute a part of this application, and the exemplary embodiments of the present application and their descriptions are intended to explain the present application and not to limit the present application. In the drawings.

DETAILED DESCRIPTION

As described above, along with the rapid development of the Internet, more and more APPS adopt the form of Feed stream to display information to users. In the process of displaying information through Feed stream, the information to be displayed may be configured to be different types of cards according to the types of the information to be displayed.

For example, a friend circle of WeChat displays status information of friends (such as friend comments and status updates) by configuring it as cards through Feed stream, and microblog displays news by configuring it as cards through Feed stream. As different information is displayed in different displaying forms, cards accordingly have a plurality of types. For example, display of stock information may indicate variation trends of stocks, and display of view information may allow comments. Therefore, different types of cards are to be configured.

With the continuous update of the version of an APP, new card types will appear in a new version. These new types of cards cannot be displayed in an old version. In the current technologies, when an APP is unable to display a card type, the user is guided to update the version of the APP. After the user completes version update of the APP under the guidance, this type of card can be displayed.

However, the method for achieving display of a new type of card in an APP by updating the APP version has the following problem: when APP version update fails because the APP server is busy or due to other circumstances, the new type of cards still cannot be displayed, causing a lower user experience of the APP.

The technical solutions of the present application will now be clearly and completely described with reference to the embodiments and accompanying drawings of the present application from which its objectives, technical solutions and advantages will be evident. Obviously, the described embodiments are only some and not all of the embodiments of the present application. Based on the embodiments in the present application, all other embodiments obtained by those of ordinary skill in the art without creative effort shall fall within the scope of the present application.

Below by referring to the accompanying drawings, the technical solutions according to the embodiments of the present application are described in detail.

Embodiment 1

Figure 1:
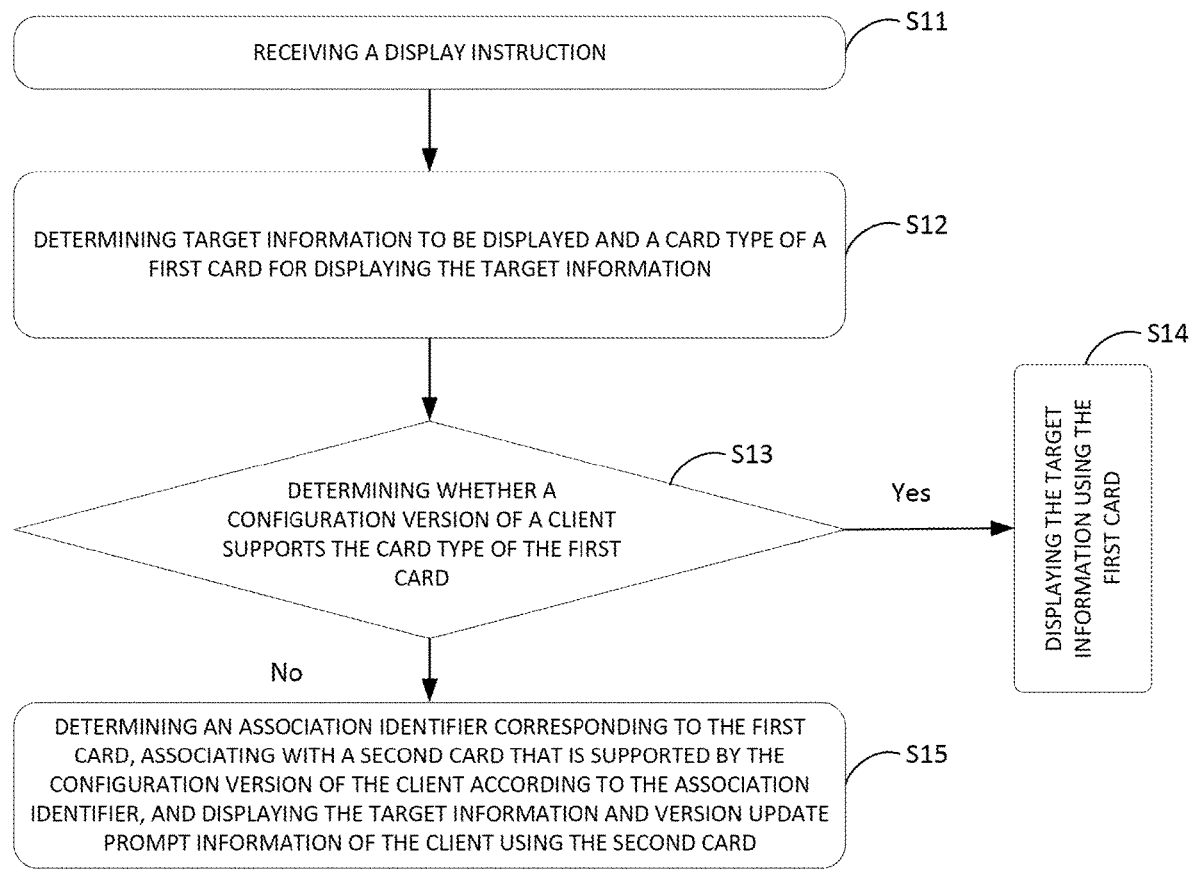
FIG. 1 is a schematic diagram of the implementation flow of a card-based information displaying method according to Embodiment 1 of the present application.

Embodiment 1 provides a card-based information displaying method. This method is used on a client and can solve the problem in current technologies. The schematic diagram of its flow is shown in FIG. 1, including the following steps:

Step S11: receiving a display instruction.

The client may be a client of an APP, or a client of a Web APP.

Under some conditions, the client will receive a display instruction. For example, when a designated time point (9 AM or any other time point) comes, the client may receive a display instruction; or, when a server requests the client to display some information (advertisement, news information, etc.), it will send a display instruction to the client; or, according to a personal setting of a user, under certain conditions (for example, the status of a friend is updated), the client will receive a display instruction; or, through triggering, a user causes the client to receive a display instruction, and a typical way of triggering by a user may be clicking the mouse, clicking the touch screen button or pulling the touch screen.

Taking a user's refreshing of a WeChat friend circle for example, when a user touches a friend circle button on the touch screen, the client will receive a display instruction. Based on this display instruction, status updates of WeChat friends and/or advertisements pushed by the server, etc. can be displayed. In a microblog, when a user refreshes the microblog by pulling or other methods, the client of the microblog will receive a display instruction to display status updates of the user's friends, news information, etc.

Step S12: determining target information to be displayed and a card type of a first card for displaying the target information.

Target information typically may be news information, advertisement information, weather forecast messages, traffic messages, fund or stock messages, comment messages, friend circle status messages, etc. Further, elements for presenting the target information may be text, picture, audio and/or video.

For example, when a user refreshes a WeChat friend circle, new status messages after friends' update is the target information to be displayed. The elements for presenting this target information may be text, picture, audio and/or video.

In some embodiments, every card for displaying the target information has a corresponding card type that indicates a category of the card. For example, a comment type of card corresponds to a card type of comment (for short, comment card), a stock type of card corresponds to a card type of stock (also referred to as stock card), and a fund type of card corresponds to a card type of fund (also referred to as fund card). These different types of cards correspond to different categories. Further, as far as clients are concerned, clients of different configuration versions can display different card types, and a configuration version of a client has a corresponding relation with the card type that can be displayed.

In some embodiments, determining target information and a card type of a first card by a client may be: obtaining target information and a card type of a first card, and may further be: obtaining the target information and the card type of the first card from cached data of the client, where this method can raise the response speed of card display. In addition, it may further be: obtaining the target information and the card type of the first card from a server.

Step S13: determining whether the configuration version of the client supports the card type of the first card, and if yes, then proceeding to Step S14; if no, then proceeding to Step S15.

In some embodiments, whether the configuration version of client supports the card type of a first card may be determined by a plurality of methods. A few embodiments are described below.

In some embodiments, a white list may be configured in the client. In the white list, the card types supported by the configuration version of the client are recorded. Then, when it is determined whether the configuration version of the client supports the card type of the first card, the card type of the first card may be matched with the card types contained in the white list and, according to a result of the match, it is determined whether the configuration version of the client supports the card type of the first card. When the match is successful, it is determined that the configuration version of the client supports the card type of the first card. When the match fails, it is determined that the configuration version of the client does not support the card type of the first card.

This determination method through a white list can be easily achieved in actual applications. When a new card type that is supported by the client of the configuration version is added, the card types recorded in the white list can be updated.

In some embodiments, a client can include a version identifier of a configuration version. The version identifier can uniquely identify the client of the configuration version. A corresponding relation between the configuration version of the client and its supported card type can be manifested as a corresponding relation between the version identifier and the supported card type. Therefore, when a client contains a corresponding relation between a version identifier of a configuration version and a card type that is supported by the configuration version, firstly the version identifier of the configuration version of the client may be determined, then the card type that is supported by the configuration version corresponding to the version identifier is determined according to this corresponding relation, and then it is determined whether the configuration version of the client supports the card type of the first card according to the card type of the first card and the determined card type that is supported by the configuration version of the client.

Step S14: displaying the target information using the first card.

When it is determined that the configuration version of a client supports the card type of the first card, the target information may be displayed by using the first card.

Step S15: determining an association identifier corresponding to the first card, associating with a second card that is supported by the configuration version of the client according to the association identifier, and displaying the target information and version update prompt information of the client using the second card.

When it is determined that the configuration version of a client does not support the card type of the first card, a second card that is supported by the configuration version of the client may be associated through the association identifier corresponding to the first card. In some embodiments, a card type of a second card is a card type that is supported by the client of the configuration version.

For example, the configuration version of a client is "XYZ", the card types supported by the client are A, B and C, and the card type of a first card is D. When it is determined that the client of the configuration version does not support the card type (D) of the first card, the card type A, B or C may be associated with through the association identifier of the first card, and then a card of the type A, B or C is used to display target information and version update prompt information of the client. In some embodiments, the card of the type A, B or C may be referred to as a second card.

In some embodiments, as the configuration version of a client may often be updated, in order that the client can display target information through the same card type of card when it is determined that the client does not support a card type, the card type of a second card may be set as a card type that is supported by a plurality of configuration versions. In this way, when it is determined that a client does not support a type of card, displaying can be conducted through the same designated card type of card, facilitating the management of the displayed cards.

Further, it is mentioned in Step S12 that, when target information and the card type of a first card are obtained from a server, a second card may also be obtained from the server at the same time, and after the second card is obtained, the second card may be cached on a client. In this way, when a second card that is supported by the configuration version of the client is associated with according to the association identifier, the second card that has been cached on the client may be associated with according to the association identifier, thus reducing the time spent in obtaining the second card and raising response speed.

In the method of Embodiment 1, when it is determined that the configuration version of a client does not support the card type of the first card, a second card that is supported by the configuration version is associated with through the association identifier in the first card, and the second card is used to display the target information and version update prompt information of the client, thus solving the problem in current technologies that a new card type of card cannot be displayed if the configuration version of the client is not updated. Further, the card type of the second card may also be uniformly configured as a card type that is supported by a plurality of configuration versions. In this way, when it is determined that a client does not support a type of card, displaying can be conducted through this unified type of card, facilitating the management of the displayed cards.

Further, when target information is displayed through a second card, version update prompt information of a client may also be displayed at the same time. Through this version update prompt information, the user is prompted to update the version. In some embodiments, as the user does not know the client has a new configuration version, and if version update prompt information of a client is not displayed at the same time as the target information is displayed through a second card, the user will not update the configuration version of a client, thus being unable to experience improvement brought by the new configuration version of the client in a timely manner and causing loss of service volume of the company providing the version update service.

In particular, a first card can display target information (referred to hereinafter as first target information), and a second card can display second target information corresponding to the first target information. In some embodiments, the second target information may be same as the first target information and may also be target information obtained after adjustment of corresponding elements for presenting the first target information. The second target information may, according to the actual need, be determined according to the first target information.

For example, first target information comprises text A, picture B and picture C, and second target information may be text A, picture B and picture C, or may be only text A, or may be text A and picture A (or picture B), or may be a part of text A, and so on.

In some embodiments, target information of a client obtained from a server, a card type of a first card or an association identifier is obtained in a fixed data format. This fixed data format is specified by a protocol format predefined by the client and the server. For example, the protocol format may be as shown below.

Data of a first card is abstracted into a FeedViewItem class and an association field (it may be vividly referred to as a "singular field" or "singular") is added to the FeedViewItem class. An exemplary FeedViewItem class picture may be as shown in Table 1.

TABLE 1

FeedViewItem class

| Attribute | Data type | Description |
| --- | --- | --- |
| feedId | String | Card id of the first card |
| type | String | Card type of the first card |
| content | json | Target information of the first card |
| create time | Long | Timestamp of the first card |
| singular | json | Association identifier |

In FeedViewItem class, through the data in the "type" field (i.e., a card type of a first card), when it is determined that the configuration version of a client does not support the card type of the first card, a second card is associated through the data in the "singular" field (i.e., association identifier) so as to display target information and version update prompt information of a client through a second card (it may be vividly referred to as a "singular card" or "singular").

In some embodiments, a second card (singular card) may also be abstracted into a data class. An example of this data class may be as shown in Table 2.

TABLE 2

Data class of a singular card

| Attribute | Data type | Description |
| --- | --- | --- |
| content | String | Target information in the singular card |
| referenceMap | json | Link contained in target information |
| tip | String | Version update prompt information in the singular card |
| tipReferenceMap | json | Link contained in version update prompt information |
| clickUrl | String | Link redirected to when the singular card is clicked on |

In some embodiments, the "clickUrl" field defines a link which achieves page redirect when the entire singular card is clicked on; the "content" field defines the target information displayed in the singular card; the "referenceMap" field defines a link contained in the target information, e.g., a link for downloading a new configuration version and/or a link for associating with other users (for example, @other users); the "tip" field defines version update prompt information in the singular card, and through this version update prompt information, a user may be reminded to update the version; and the "tipReferenceMap" field defines a link contained in the version update prompt information, and through this link, a new configuration version may be downloaded.

Further, in the programming stage, placeholders may be added to each of the fields to facilitate the programming. Below the placeholders are described one by one:

For example, a placeholder "U" represents username, "G" represents picture, "S" represents stock, "F" represents fund, "T" represents topic, "V" represents video, and "L" represents link.

When a singular card is displayed, size, color, pattern, link address and other information of every presenting element (text, picture, audio, video, etc.) in the singular card may be specified according to preset rules. In some embodiments, they may be specified by establishing a ReferenceData class. An exemplary ReferenceData class may be as shown in Table 3.

TABLE 3

| ReferenceData class | | |
|---|---|---|
| Attribute | Data type | Description |
| referString | String | Define the display pattern of a link (highlight, italic, bold, etc., and highlight is taken as an example below) |
| matchStart | int | Define the position of the starting character of highlight |
| matchEnd | int | Define the position of the ending character of highlight |
| placeHolderKey | String | Content for replacing a placeholder |

Figure 2:
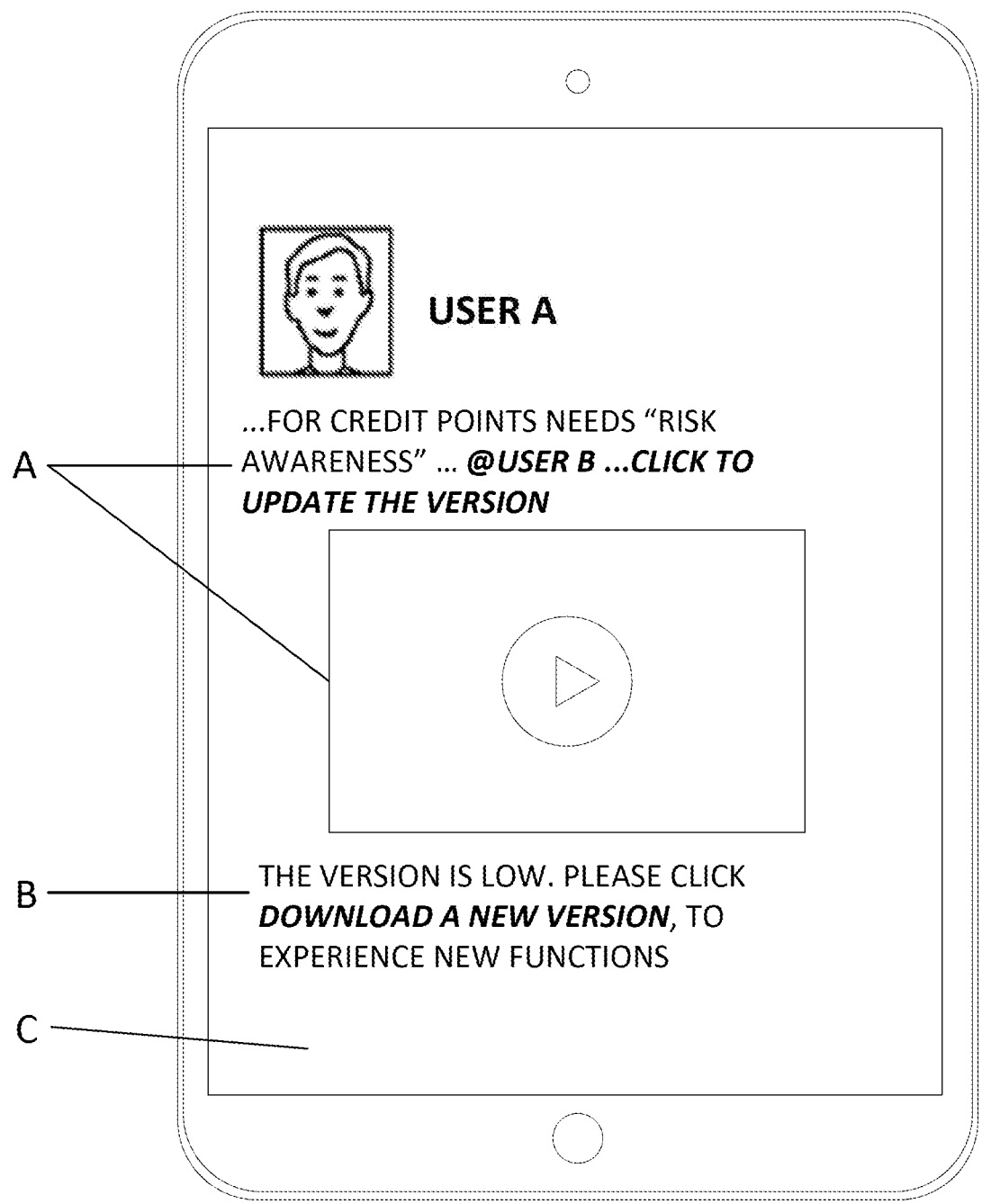
FIG. 2 is a schematic diagram of a singular card according to the Embodiment 1 of the present application.

FIG. 2 shows a singular card according to the Embodiment 1 of the present application. In the singular card, the portion indicated by symbol "A" is target information (including text content and video) in the singular card and determined by the "content" field in Table 2. Further, in the "A" portion, the italic and bold part (in an actual application, it may be highlighted or in other display patterns) is a link contained in the target information. The address of this link is determined by the "referenceMap" field in Table 2. Further, the italic and bold display pattern, as well as the starting character and ending character with the italic and bold display pattern are determined by the "referString", "matchStart" and "matchEnd" fields in Table 3 respectively. The portion indicated by "B" is version update prompt information of a client in the singular card and determined by the "tip" field in Table 2. Further, in the portion of "B", the italic and bold part (in some embodiments, it may be highlighted or in other display patterns) is a link contained in the B. The address of this link is determined by the "tipReferenceMap" field in Table 2. The italic and bold display pattern of this link, and the starting character and ending character with the italic and bold display pattern are also determined by the "referString", "matchStart" and "matchEnd" fields in Table 3 respectively. The portion indicated by "C" is the entire singular card interface. Clicking the singular card interface can achieve page redirect. The address of this page redirect link is determined by the "clickUrl" field in Table 2.

Embodiment 2

Figure 3:
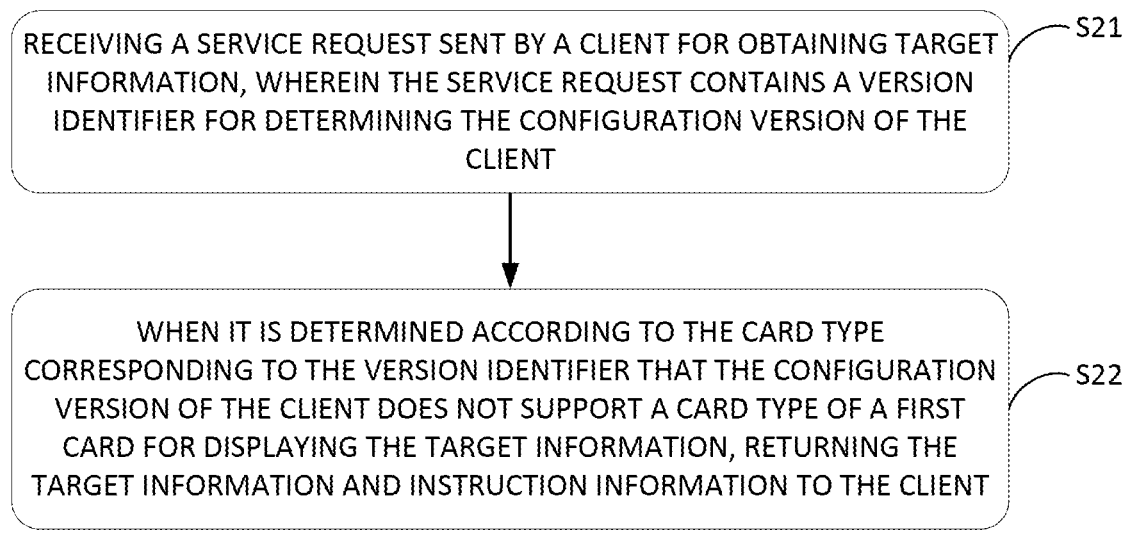
FIG. 3 is a schematic diagram of the implementation flow of an information displaying service processing method according to Embodiment 2 of the present application.

The method provided in Embodiment 1 is used on a client. In some embodiments, when target information is to be displayed, data may be instantaneously obtained from a server. Therefore, Embodiment 2 of the present application will provide an information displaying service processing method. This method is used on a server and able to solve the problem in current technologies. The schematic diagram of its flow is shown in FIG. 3, including the following steps:

Step S21: receiving a service request sent by a client for obtaining target information, wherein the service request contains a version identifier for determining the configuration version of the client, and the version identifier has a corresponding relation with the card type that is supported by the configuration version of the client.

The target information in Step S21 is the same as the target information in Step S12, so it will not be described again.

The service request contains a version identifier of the configuration version of the client which sends the service request. The version identifier has a corresponding relation with the card type that is supported by the configuration version of the client.

Step S22: when it is determined according to the card type corresponding to the version identifier that the configuration version of the client does not support a card type of a first card for displaying the target information, returning to the client the target information and instruction information that instructs the client to display the target information and version update prompt information of the client using the second card that is supported by the configuration version of the client.

In some embodiments, whether a client supports the card type of the first card may be determined on a server. When the client does not support the card type, the target information and instruction information are returned to the client, and through the instruction information the client is instructed to use a second card to display target information. The card type of the first card may be a new card type, and the card type of a second card is a card type that is supported by the configuration version of the client. That is to say, the server determines whether a client supports a new card type. When the client does not support the card type, the client is instructed through the instruction information to use a supported card type to display target information.

Further, when a server returns the target information and instruction information to a client, it may return the target information and instruction information to the client in a form of json (JavaScript Object Notation) character string.

In the method provided by Embodiment 2 of the present application, when a server determines that the configuration version of a client does not support the card type of a first card, the server will instruct the client through instruction information to use a second card to display target information and version update prompt information of the client, thus solving the problem in current technologies. Further, compared with Embodiment 1, this method, which determines on a server whether the configuration version of a client supports the card type of a first card, can raise the speed for displaying target information because a server has stronger computing power than a client.

In some embodiments, when the computing load of the server is large, in order to alleviate the computing load of the server, the method provided in Embodiment 1 may be adopted and target information can be displayed after determination by the client.

Figure 4:
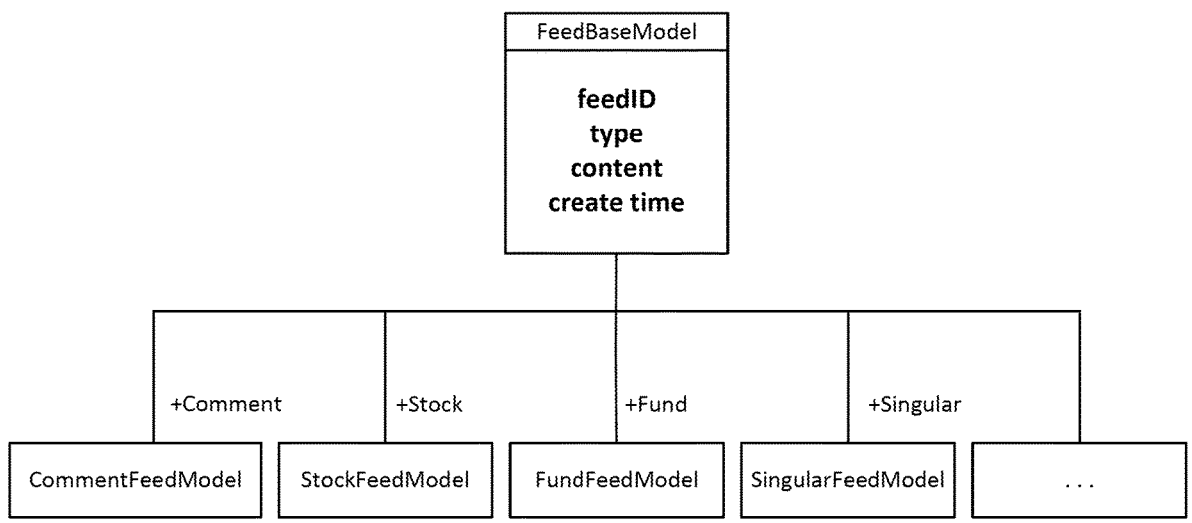
FIG. 4 is a schematic diagram of generation of a card type through a card base class according to the Embodiment 2 of the present application.

In some embodiments, when a new card type is generated on the server, a card base class (FeedBaseModel) is first generated, and then a new card type is generated through the card base class. The FeedBaseModel may comprise four basic fields: feedID, type, content and create time. When a new card type is to be generated, a corresponding new field is added on the basis of the four basic fields, as shown in FIG. 4.

For example, when a singular card is to be generated, a singular field is added on the basis of the four basic fields: feedID, type, content and create time. When a comment card (CommentFeedModel) is to be generated, a "Comment" field is added on the basis of the four basic fields: feedID, type, content and create time. When a stock card is to be generated, a "Stock" field is added on the basis of the four basic fields: feedID, type, content and create time. Further, fund card (FundFeedModel), SpecialFeedModel, FootmarkFeedModel and other card types may also be generated correspondingly.

Figure 5:
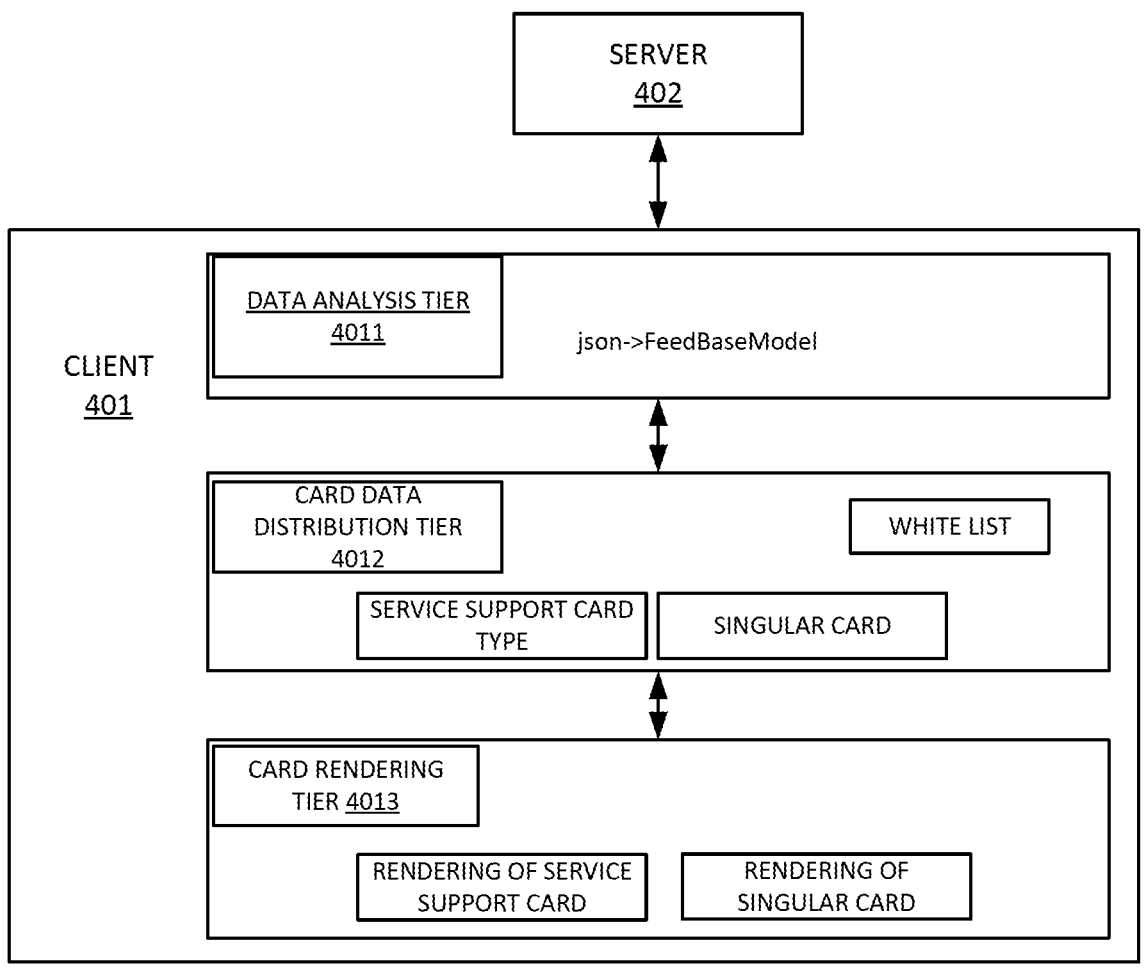
FIG. 5 shows an information displaying system according to the Embodiment 2 of the present application.

FIG. 5 shows an information display system comprising a client 401 and a server 402. The client 401 in the system may further comprise three tiers, including: a data analysis tier 4011, a card data distribution tier 4012 and a card rendering tier 4013.

Server 402: It generates card data of a card for displaying target information according to a service request and sends the card data to the client 401 in a form of Json character string. The server 402 may maintain a white list that can be updated so that through the server 402, the card type that can be supported by the client 401 may be determined. Further, the white list in the client 401 may also be synchronized with the white list in the server 402.

Data analysis tier 4011: It analyzes the corresponding card type from the card data issued by the server 402 in the form of j son character string.

Card data distribution tier 4012: According to the white list in the client 401, it parses the card type that can be recognized into a corresponding type of card and parses the cards not in the white list into singular cards uniformly. Further, in some embodiments, when the client 401 is just started (or at the designated time point), the white list in the client 401 may also be synchronized with the white list maintained in the server 402.

Card rendering tier 4013: It is used to render a corresponding type of card from the result of the card data distribution tier 4012 and to display it.

Embodiment 3

Figure 6:
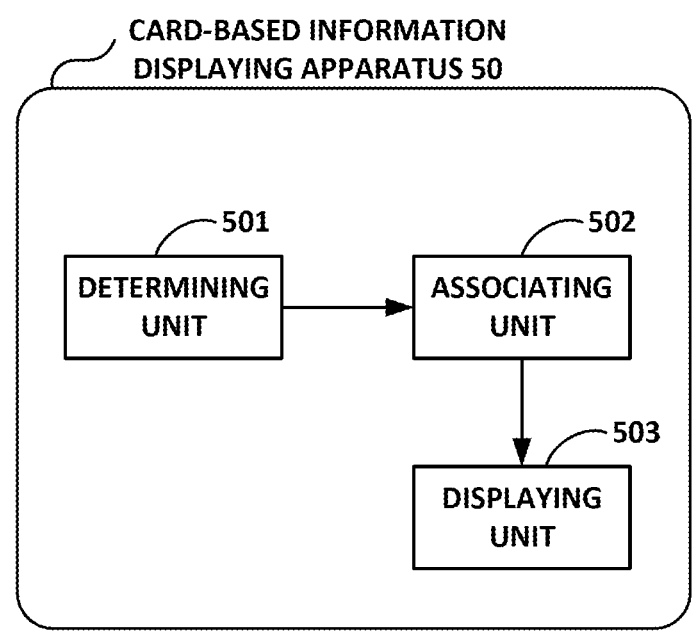
FIG. 6 is a structural diagram of a card-based information displaying apparatus according to Embodiment 3 of the present application.

Based on the same inventive concept as that of Embodiment 1, Embodiment 3 of the present application provides a card-based information displaying apparatus. The apparatus is located on a client. As shown in FIG. 6, the apparatus 50 comprises: a determining unit 501, an associating unit 502 and a displaying unit 503, here:

determining unit 501, determining target information to be displayed and a card type of a first card for displaying the target information, associating unit 502, when it is determined that a configuration version of a client does not support the card type of the first card, determining an association identifier corresponding to the first card, and associating with a second card supported by the configuration version of the client according to the association identifier, displaying unit 503, displaying the target information and version update prompt information of the client using the second card.

When the apparatus 50 provided by Embodiment 3 of the present application is adopted, as the apparatus 50 is based on the same inventive concept as that of Embodiment 1, it can solve the problem in current technologies. Further, in some embodiments, the apparatus 50 may also achieve other implementation effects in combination with other hardware devices. For example, the client of the apparatus 50 is mounted on a mobile terminal. As the client can display through a second card the target information that cannot be displayed through a first card in current technologies, the user experience of the mobile terminal can be raised, thus increasing the business value of the mobile terminal.

Embodiment 4

Figure 7:
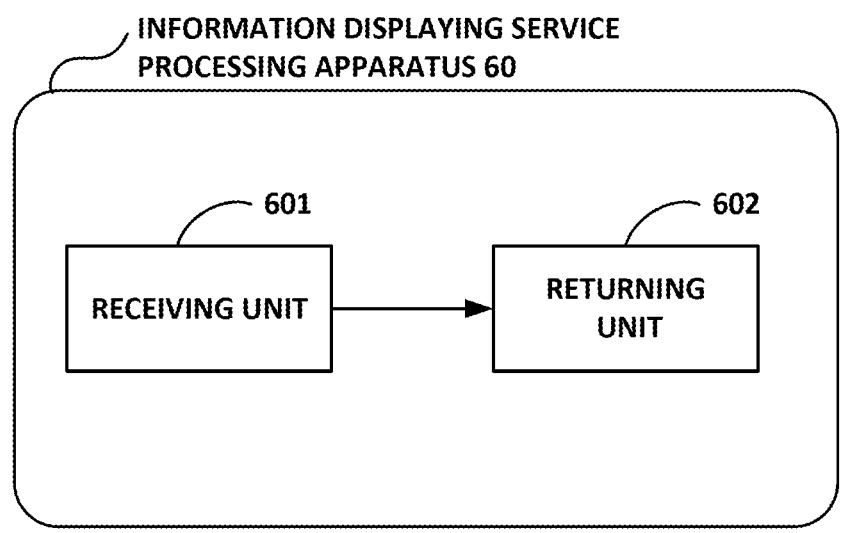
FIG. 7 is a structural diagram of an information displaying service processing apparatus according to Embodiment 4 of the present application.

Based on the same inventive concept as that of Embodiment 2, Embodiment 4 of the present application provides an information displaying service processing apparatus. The apparatus is located on a server. As shown in FIG. 7, the apparatus 60 comprises: a receiving unit 601 and a returning unit 602, here:

receiving unit 601, receiving a service request sent by a client for obtaining target information, wherein the service request contains a version identifier for determining a configuration version of the client, and the version identifier has a corresponding relation with the card type supported by the configuration version of the client, returning unit 602, when it is determined according to the card type corresponding to the version identifier that the configuration version of the client does not support the card type of a first card for displaying the target information, returning to the client the target information and instruction information that is used to instruct the client to display the target information and version update prompt information of the client using the second card that is supported by the configuration version of the client.

When the apparatus 60 provided by Embodiment 4 of the present application is adopted, as the apparatus 60 is based on the same inventive concept as that of Embodiment 2, it can solve the problem in current technologies. Further, the apparatus 60 is located on a server, and determining through a server whether a client can recognize a first card can raise the speed of displaying target information because a server has a stronger computing power than a client does.

In some embodiments, when target information and instruction information are returned to a client via a returning unit 602, the target information and instruction information may be returned to the client in a form of j son character string.

Those skilled in the art should understand that the embodiments of the present application may be provided as methods, systems or computer program products, so the present application may adopt embodiments in a form of complete software, or complete hardware, or combination of software and hardware. Further, the present application may adopt a form of computer program product implemented on one or a plurality of computer-usable storage media (including but not limited to disk memory, CD-ROM and optical memory) that contain computer-usable program codes.

The present application is described by referring to the flow charts and/or block diagrams of the methods, devices (systems) and computer program products according to the embodiments of the present application. Every flow and/or block in the flow charts and/or block diagrams, and the combination of the flows and/or blocks in the flow charts and/or block diagrams may be achieved through computer program instructions. These computer program instructions may be provided to a general-purpose computer, a special-purpose computer, an embedded processor, or the processor of any other programmable data processing equipment to generate a machine so that, through the instructions executed by a computer or a processor of any other programmable data processing equipment, an apparatus for achieving the functions designated in one or a plurality of flows in the flow charts and/or one or a plurality of blocks in the block diagrams is generated.

These computer program instructions may also be stored in a computer readable memory that can guide a computer or other programmable data processing equipment to work in a specific way so that the instructions stored in the computer readable memory generate a product comprising the instruction apparatus. The instruction apparatus achieves the functions designated in one or a plurality of flows in the flow charts and/or one or a plurality of blocks in the block diagrams.

These computer program instructions may also be loaded to a computer or other programmable data processing equipment so that a series of operating steps are executed on the computer or other programmable data processing equipment to generate the processing achieved by computer, thus the instructions executed on the computer or other programmable data processing equipment provide steps for achieving the functions designated in one or a plurality of flows in the flow charts and/or one or a plurality of blocks in the block diagrams.

In a typical configuration, the computing equipment comprises one or a plurality of processors (CPU), I/O interfaces, network interfaces and internal memories.

The internal memory may be in a form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, movable and non-movable media and may achieve information storage by any method or technology. Information may be computer readable instructions, data structure, program modules or other data. The examples of computer storage media include without limitation phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact disc-read only memory (CD-ROM), digital video disk (DVD) or other optical memory, cassette type magnetic tape, tape disk memory or other magnetic storage devices or any other non-transfer media. They may be used to store information that is accessible to computer devices. According to the definition in this document, computer readable media do not include transitory media, such as modulated data signals and carriers.

Terms "include", "contain" or their variants are intended to cover non-exclusive inclusion so that a process, method, commodity or equipment, including a series of elements not only includes these elements but also includes other elements not clearly set out, or also includes the elements inherent to such process, method, commodity or equipment. Unless with more limitations, the elements defined by sentence "include one" do not exclude that the process, method, commodity or equipment including the elements also have other same elements.

Those skilled in the art should understand that the embodiments of the present application may be provided as methods, systems or computer program products, so the present application may adopt embodiments in a form of complete software, or complete hardware, or combination of software and hardware. Further, the present application may adopt a form of computer program product implemented on one or a plurality of computer-usable storage media (including but not limited to disk memory, CD-ROM and optical memory) that contain computer-usable program codes.

The foregoing descriptions are embodiments of the present application and are not intended to limit the present application. For those skilled in the art, the present application may have various changes and modifications. All modifications, identical replacements and improvements made without departing from the spirit and principle of the present application shall fall within the scope of the present application.

What is claimed is:

1. A card-based information displaying method for a client, wherein the method comprises:
   in response to a request for target information to be displayed on the client, obtaining, from a server, the target information to be displayed and a card type of a first card for displaying the target information, wherein the client contains a list which contains card types that are supported by a configuration version of the client;
   obtaining, from the server, a second card supported by the configuration version of the client at the same time as obtaining the target information and the card type of the first card;
   caching the second card;
   matching the card type of the first card with the card types contained in the list;
   according to a result of the matching, determining whether the configuration version of the client supports the card type of the first card;
   when it is determined that the configuration version of the client does not support the card type of the first card, determining an association identifier corresponding to the first card, and associating the cached second card supported by the configuration version of the client with the association identifier; and
   responsive to associating the cached second card with the association identifier, displaying the target information on the client using the cached second card.

2. The method according to claim 1, wherein the client contains a corresponding relation between a version identifier of the configuration version of the client and the card type supported by the configuration version, and wherein determining whether the configuration version of the client supports the card type of the first card comprises:
   determining the version identifier of the configuration version of the client, and based on the corresponding relation, determining the card type supported by the configuration version corresponding to the version identifier; and
   according to the card type of the first card and the determined card type supported by the configuration version of the client, determining whether the configuration version of the client supports the card type of the first card.

3. The method according to claim 1, wherein associating the cached second card supported by the configuration version of the client with the association identifier comprises:
   according to the association identifier, determining card data of the cached second card associated with the first card; and
   according to the card data, determining the cached second card is supported by the configuration version of the client.

4. The method according to claim 1, wherein the method further comprises:

displaying version update prompt information of the client using the cached second card.

5. A card-based information displaying apparatus, wherein the apparatus is located on a client and comprises: one or more processors and one or more non-transitory computer-readable memories coupled to the one or more processors and configured with instructions executable by the one or more processors to cause the apparatus to perform operations comprising:

in response to a request for target information to be displayed on the client, obtaining, from a server, the target information to be displayed and a card type of a first card for displaying the target information, wherein the client contains a list which contains card types that are supported by a configuration version of the client;

obtaining, from the server, a second card supported by the configuration version of the client at the same time as obtaining the target information and the card type of the first card;

caching the second card;

matching the card type of the first card with the card types contained in the list;

according to a result of the matching, determining whether configuration version of the client supports the card type of the first card;

when it is determined that a configuration version of a client does not support the card type of the first card, determining an association identifier corresponding to the first card, and associating the cached second card supported by the configuration version of the client with the association identifier; and responsive to associating the cached second card with the association identifier, displaying the target information on the client using the cached second card.

6. The apparatus according to claim 5, wherein the client contains a corresponding relation between a version identifier of the configuration version of the client and the card type supported by the configuration version, and wherein determining whether the configuration version of the client supports the card type of the first card comprises:

determining the version identifier of the configuration version of the client, and based on the corresponding relation, determining the card type supported by the configuration version corresponding to the version identifier; and according to the card type of the first card and the determined card type supported by the configuration version of the client, determining whether the configuration version of the client supports the card type of the first card.

7. The apparatus according to claim 5, wherein associating the cached second card supported by the configuration version of the client with the association identifier comprises:

according to the association identifier, determining card data of the cached second card associated with the first card; and according to the card data, determining the cached second card is supported by the configuration version of the client.

8. The apparatus according to claim 5, wherein the operations further comprise:

displaying version update prompt information of the client using the cached second card.

9. One or more computer-readable media configured with instructions executable by one or more processors to perform operations for a client comprising:

in response to a request for target information to be displayed on the client, obtaining, from a server, the target information to be displayed and a card type of a first card for displaying the target information, wherein the client contains a list which contains card types that are supported by a configuration version of the client;

obtaining, from the server, a second card supported by the configuration version of a client at the same time as obtaining the target information and the card type of the first card;

caching the second card;

matching the card type of the first card with the card types contained in the list;

according to a result of the matching, determining whether configuration version of the client supports the card type of the first card;

when it is determined that a configuration version of a client does not support the card type of the first card, determining an association identifier corresponding to the first card, and associating the cached second card supported by the configuration version of the client with the association identifier; and responsive to associating the cached second card with the association identifier, displaying the target information on the client using the cached second card.

10. The one or more computer-readable media according to claim 9, wherein the client contains a corresponding relation between a version identifier of the configuration version of the client and the card type supported by the configuration version, and wherein determining whether the configuration version of the client supports the card type of the first card comprises:

determining the version identifier of the configuration version of the client, and based on the corresponding relation, determining the card type supported by the configuration version corresponding to the version identifier; and according to the card type of the first card and the determined card type supported by the configuration version of the client, determining whether the configuration version of the client supports the card type of the first card.

11. The one or more computer-readable media according to claim 9, wherein associating the cached second card supported by the configuration version of the client with the association identifier comprises:

according to the association identifier, determining card data of the cached second card associated with the first card; and according to the card data, determining the cached second card is supported by the configuration version of the client.

12. The one or more computer-readable media according to claim 9, wherein the operations further comprise:

displaying version update prompt information of the client using the cached second card.

* * * * *